O. P. OSTERGREN.
PRESSURE BALANCING MEANS.
APPLICATION FILED FEB. 13, 1911.
1,001,677.
Patented Aug. 29, 1911.
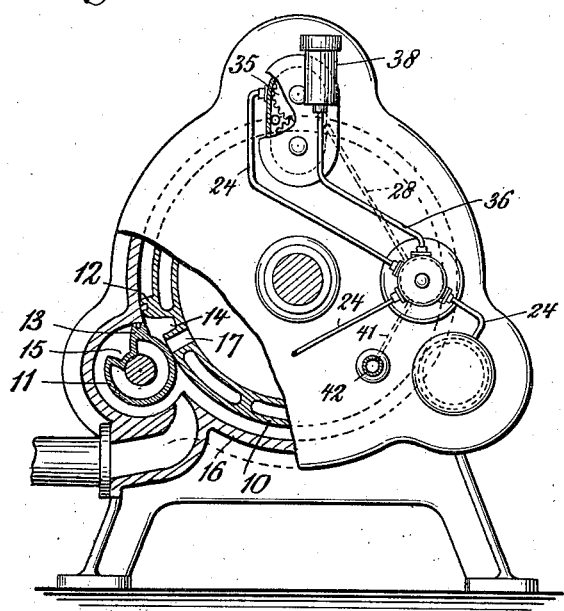
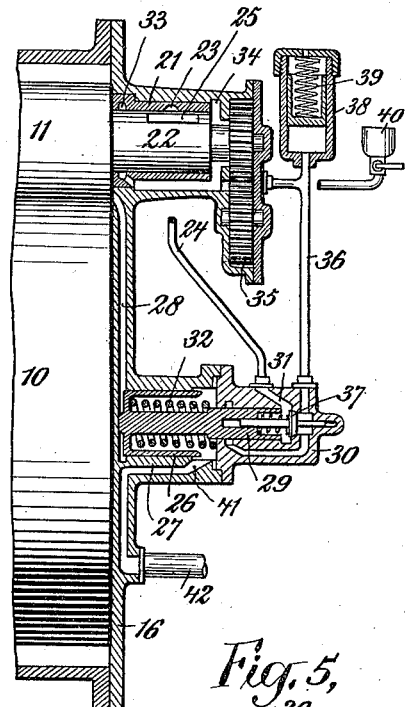
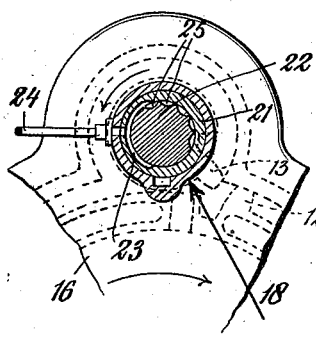
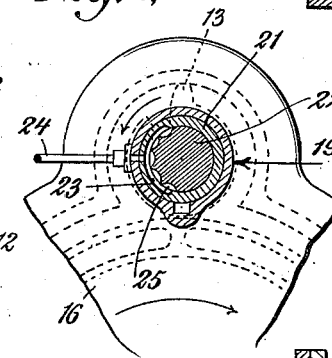
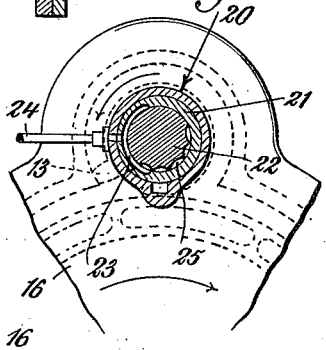
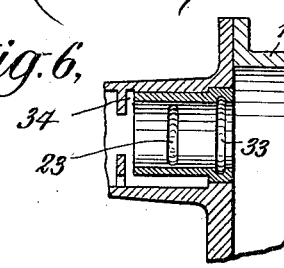
WITNESSES:
INVENTOR
Oscar P. Ostergren
BY
his ATTORNEYS

UNITED STATES PATENT OFFICE.

OSCAR P. OSTERGREN, OF BROOKLYN, NEW YORK, ASSIGNOR OF ONE-FOURTH TO WILLIAM V. HIRSH, OF BROOKLYN, NEW YORK.

PRESSURE-BALANCING MEANS.

1,001,677.      Specification of Letters Patent.    Patented Aug. 29, 1911.

Application filed February 13, 1911. Serial No. 608,212.

*To all whom it may concern:*

Be it known that I, OSCAR P. OSTERGREN, a subject of the Crown of Sweden, and a resident of Brooklyn, county of Kings, and State of New York, have invented certain new and useful Improvements in Pressure-Balancing Means, of which the following is a specification, reference being had to the accompanying drawings, forming a part thereof.

My invention relates to pressure balancing means, and particularly to means for counterbalancing rotating elements against which pressure is applied radially in varying angular directions.

In rotary engines of the type illustrated in a co-pending application Serial Number 579,478, filed by me on the 29th day of August, 1910, in which there is a central main rotating head or element and supplemental smaller rotating heads or elements surrounding the same, the central head is balanced by the fact that the motive fluid acts uniformly thereon at different points around it, but the supplemental heads are out of balance so far as the action of the motive fluid is concerned, the motive fluid acting against them radially in various angular directions, whereby if such motive fluid pressure be not counterbalanced the result is a severe radial wear upon the bearings.

My present invention is mainly directed to the counterbalancing of such and kindred devices by the application of a fluid under pressure which acts in a radial direction upon the rotatable element being balanced, in varying angular directions oppositely corresponding to the directions in which the motive fluid acts. The balancing fluid is preferably a lubricating material which is caused to act against the journals of the rotating element, and in so doing serves as an efficient lubricating means therefor in addition to counterbalancing the pressure as aforesaid.

A further object of the invention is to vary the counterbalancing pressure in proportion as the pressure to be balanced varies, for it will be readily seen that the amounts of pressure to be balanced will vary in accordance with variations in the pressure of the motive fluid employed. To this end I employ the motive fluid as a means for applying the counterbalancing pressure, the same being applied through the medium of the lubricating fluid as aforesaid.

My invention also consists in many novel details of construction and combinations of parts such as will be fully pointed out hereinafter, and in order that my invention may be thoroughly understood, I will now proceed to describe an embodiment thereof having reference to the accompanying drawings illustrating the same, and will then point out the novel features in claims.

In the drawings: Figure 1 is a view in part end elevation and part transverse section of a rotary engine equipped with pressure balancing means constructed in accordance with my invention. Fig. 2 is a view in central longitudinal section through a portion of the engine upon a somewhat larger scale. Figs. 3, 4 and 5 are detail transverse sectional views through a journal and the bearing therefor of one of the rotary elements showing the parts in different relative positions. Fig. 6 is a detail view in longitudinal section through a trunnion bearing for one of the supplemental heads, and showing particularly the inlet feed groove employed.

For a complete and detail description of a rotary engine of the type herein shown, I refer to the aforesaid copending application Serial No. 579,478. In general the engine includes a main rotary impelling element or head 10, and a plurality of supplemental rotating elements or heads 11 surrounding it, the said rotary elements being in the main cylindrical and disposed in rolling contact with each other, but being provided with lateral abutments 12—13, and complementary recesses 14—15 for receiving them, the said main and supplemental heads or impelling elements being suitably mounted in a casing 16. Motive fluid is admitted to the interior of the main head or element 10 whence it passes through passages 17 therein to annular chambers formed around the said supplemental elements or heads 11 between the peripheries thereof and the interior walls of the casing. It will be apparent that if the supplemental heads are disposed equidistantly around the main head, the main head will be balanced radially so far as the motive fluid is concerned, but on the other hand the supplemental heads will be out of balance. The motive fluid in acting thereon will not only bear against the lateral projections 13 by reason of which the supplemental heads are revolved, but will also press radially against the peripheries of the heads. In Figs. 1, 2 and 3 the parts are shown in substantially the same position, and in such position the direction of such pressure with respect to the bearings will be in the direction of the arrow 18 in Fig. 3. As the head revolves and a greater proportion of the periphery is exposed to such pressure, the general direction of pressure will change. For instance, when the parts move to the position in Fig. 4, the general direction of the pressure is indicated by the arrow 19, while in Fig. 5 such general direction is indicated by the arrow 20. The general direction of the pressure varies angularly as the head revolves, as will thus readily be seen. To counterbalance this pressure and to take care of the varying angular direction thereof, I have provided the bearings 21 for the journals 22 of the said supplemental heads 11 with an interior groove 23 disposed in open communication with a conduit 24 for supplying oil under pressure, and I have provided the journals 22 with a plurality of longitudinally disposed peripheral grooves 25 for coaction therewith. These grooves are so arranged that the first of the longitudinal grooves 25 just reaches the end of the inlet groove 23 at the time motive fluid commences to bear radially against the head 11 (see Figs. 1, 2 and 3). The position of this first longitudinal groove is just opposite the direction of the pressure indicated by the arrow 18 in Fig. 3, so that the oil introduced under pressure at this point will bear against the journal to resist such pressure and at a point just opposite the point at which the pressure is applied. As the head revolves and the general direction of the pressure of the motive fluid changes in angular relation, so in its revolution the trunnions thereof will bring more and more of the longitudinal grooves 25 into communication with the feed groove 23 (see Fig. 4) so that the angular relation of the counterbalancing force will shift to correspond with the varying direction of application of the motive fluid pressure which is to be counterbalanced. In Fig. 5 the parts are shown as further rotated, the last of the longitudinal grooves 25 being in communication with the feed groove 23, the others having passed away therefrom.

In order to vary the pressure of the balancing fluid in proportion to the pressure of the motive fluid which is to be balanced, I preferably provide a plunger adapted to be acted upon at one side by the motive fluid, and upon the other side to act upon the balancing fluid. Such a plunger is shown in detail in Fig. 2 of the drawings, the same comprising a piston 26 of relatively large diameter, mounted in a casing 27, the rear surface of the said head being in open communication through a passage 28 with the motive fluid when it is admitted for coöperation with the said supplemental heads, and a smaller piston or plunger 29 fitted to a reduced bore in an extension 30 of the casing 27, the same communicating with a chamber 31 in the said casing extension 30 to which the several feed pipes 24 are connected. A somewhat heavy spring 32 opposes the inward movement of the plunger.

From the foregoing it will be seen that should the motive fluid pressure drop to zero, the spring 32 would press the plunger back to the position shown in Fig. 2 and would relieve pressure upon the oil, but that on the other hand directly motive fluid is admitted along the passage 28 to the rear of the head or piston 26 of the plunger, then the same would be moved to the right as viewed in Fig. 2 and the forward end of the plunger 29 thereof would enter the chamber 31, displacing oil therein and forcing such oil along the feed pipes 24 to the bearings. The oil which leaks out of the grooves in the journals will enter annular recesses 33—34 at the opposite ends of the bearings, and will flow back to the casing of the plunger, the device in this connection operating as a distributer. In the present instance I have shown a simple form of gear pump 35 as a means for compelling the return of this discharged oil, the same communicating through a pipe 36 with the casing extension 30, a check valve 37 being provided past which the oil may readily flow to the chamber 31, but which will prevent the oil from backing up out of the said chamber, as will be well understood. An equalizer 38 may be also advantageously employed, the same including a spring pressed plunger 39 for normally forcing the oil toward the lubricator. The lubricating material may be resupplied by means of a supply cup 40 which may be properly connected with the inlet side of the gear pump. In operation the pump will act to circulate the oil and will also operate to create certain initial pressure or head therein, but the actual pressure or head will of course be determined by the position of the plunger 26—29. In the operation of an engine of this description this plunger will pulsate backward and forward, imparting pulsations to the lubricating material, timed and proportioned to the balancing requirements, and at the same time the direction of the balancing effected by the lubricating material will be determined as is required by the angular position of the parts to be balanced.

The casing 27 is conveniently provided with a leakage exhaust passage 41 which connects with a suitable exhaust pipe 42, the steam which leaks past the piston or head 26 being thus carried away to exhaust either as steam or in its condensed condition as water.

What I claim is:

1. The combination with a bearing, and a rotatable head having a journal mounted to rotate in the said bearing, of means for applying lubricating material under pressure against the said journal in a radial direction and in varying angular relations as the said rotatable head revolves.

2. The combination with a bearing having a groove therein recessed from the bearing surface thereof and extending longitudinally throughout an arc around it, and means for supplying lubricating material thereto under pressure, of a rotatable head having a journal fitted to the said bearing, the said journal having a plurality of longitudinally disposed parallel grooves therein for successive engagement with the said bearing groove.

3. The combination with a bearing, a rotatable head mounted to rotate in the said bearing, and means for applying motive fluid to the said head to actuate the same, the said motive fluid acting radially upon the said head in varying angular relations, of means for applying lubricating material under pressure against the said head, in directions opposite to the thrust produced by the motive fluid, and angularly varying as the angular direction of thrust from the motive fluid varies.

4. The combination with a bearing, and a rotatable head having a journal mounted to rotate in the said bearing, and means for applying motive fluid against the said rotatable head to actuate the same, of means for applying lubricating material under a pressure proportioned to the pressure of the motive fluid against the said journal to counterbalance the motive fluid pressure against the head.

5. The combination with a bearing, a rotatable head mounted to rotate in the said bearing, and means for applying motive fluid to the said head to actuate the same, the said motive fluid acting radially upon the said head in varying angular relations, of means for applying lubricating material under pressure against the said head, in directions opposite to the thrust produced by the motive fluid, and angularly varying as the angular direction of thrust from the motive fluid varies, and for varying the pressure of the lubricating material proportionately to the pressure of the motive fluid.

6. The combination with a bearing, and a rotatable head having a journal mounted to rotate in the said bearing, of means for conveying lubricating material against the said journal in a radial direction and in varying angular relations as the said rotatable head revolves, and a fluid pressure operated plunger for acting upon the said lubricating means.

7. The combination with a bearing, a rotatable head mounted to rotate in the said bearing, and means for applying motive fluid to the said head to actuate the same, the said motive fluid acting radially upon the said head in varying angular relations, of means for applying lubricating material against the said head, in directions opposite to the thrust produced by the motive fluid, and angularly varying as the angular direction of thrust from the motive fluid varies, and means acted upon by the motive fluid when it actuates the head, to apply pressure to the said lubricating material.

8. The combination with a bearing, a rotatable head mounted to rotate in the said bearing, and means for applying motive fluid to the said head to actuate the same, the said motive fluid acting radially upon the said head in varying angular relations, of means for applying lubricating material against the said head, in directions opposite to the thrust produced by the motive fluid, and angularly varying as the angular direction of thrust from the motive fluid varies, and a plunger, one side of which is in communication with the said motive fluid and the other with the said lubricating material.

9. In a rotary engine, the combination with a rotatable element comprising a cylindrical hub provided with a radial projection, and means for applying motive fluid to the periphery of the hub behind the projection, of a journal for the hub having a plurality of longitudinally disposed parallel grooves, a bearing having a groove therein, disposed transversely with respect to the journal grooves, and with which the said journal grooves will successively come into, and move out of, register, as the head rotates, and means for applying lubricating material under pressure to the bearing groove.

10. In a rotary engine, the combination with a rotatable element comprising a cylindrical hub provided with a radial projection, and means for applying motive fluid to the periphery of the hub behind the projection, of a journal for the hub having a plurality of longitudinally disposed parallel grooves, a bearing having a groove therein, disposed transversely with respect to the journal grooves, and with which the said journal grooves will successively come into, and move out of, register, as the head rotates, and means for applying lubricating material under a pressure proportioned to that of the motive fluid, to the bearing groove.

11. In a rotary engine, the combination with a rotatable element comprising a cylindrical hub provided with a radial projection, and means for applying motive fluid to the periphery of the hub behind the projection, of a journal for the hub having a plurality of longitudinally disposed parallel grooves, a bearing having a groove therein, disposed transversely with respect to the journal grooves, and with which the said journal grooves will successively come into, and move out of, register, as the head rotates, and a plunger, one side of which is in communication with the said motive fluid and the other with the said lubricating material.

12. In a rotary engine, the combination with a rotatable element comprising a cylindrical hub provided with a radial projection, and means for applying motive fluid to the periphery of the hub behind the projection, of a journal for the hub having a plurality of longitudinally disposed parallel grooves, a bearing having a groove therein, disposed transversely with respect to the journal grooves, and with which the said journal grooves will successively come into, and move out of, register, as the head rotates, a plunger actuated by the motive fluid to apply pressure to the lubricating material, and a pump for returning spent lubricating material to the plunger.

OSCAR P. OSTERGREN.

Witnesses:
D. HOWARD HAYWOOD,
LYMAN S. ANDREWS, Jr.

Copies of this patent may be obtained for five cents each, by addressing the "Commissioner of Patents. Washington, D. C."